(12) United States Patent
Kitsutaka

(10) Patent No.: US 6,847,361 B1
(45) Date of Patent: Jan. 25, 2005

(54) IMAGE GENERATION SYSTEM AND PROGRAM

(75) Inventor: Shigeru Kitsutaka, Kawasaki (JP)

(73) Assignee: Namco, Ltd., Tokyo (JP)

(*) Notice: Subject to any disclaimer, the term of this patent is extended or adjusted under 35 U.S.C. 154(b) by 149 days.

(21) Appl. No.: 09/830,351

(22) PCT Filed: Sep. 1, 2000

(86) PCT No.: PCT/JP00/05956
§ 371 (c)(1),
(2), (4) Date: May 25, 2001

(30) Foreign Application Priority Data

Oct. 9, 1999 (JP) .......................................... 11-256579

(51) Int. Cl.[7] .............................................. G06T 15/50
(52) U.S. Cl. ........................ 345/426; 345/581; 345/423; 345/606; 463/31; 382/274
(58) Field of Search ................................. 345/426, 428, 345/606, 581, 592, 423; 463/31, 33; 382/274

(56) References Cited

U.S. PATENT DOCUMENTS 5,949,907 A * 9/1999 Raz ............................. 382/205
5,966,134 A * 10/1999 Arias .......................... 345/589
6,188,408 B1 * 2/2001 Suzuoki ..................... 345/423
6,373,991 B1 * 4/2002 Shimazu et al. ......... 04382/266

OTHER PUBLICATIONS

Nikkei CG, No. 140, May 1998, Nikkei BP K. K. (Tokyo) "Rinkaku sen no Hinshitsu ga ima hitotsuka Electric Image" p. 129.

* cited by examiner

Primary Examiner—Matthew C. Bella
Assistant Examiner—Antonio Caschera
(74) Attorney, Agent, or Firm—Oliff & Berridge, PLC

(57) ABSTRACT

The present invention provides an image generation system and program that apply shading for producing a cel animation type of image, with a reduced processing load. Brightness information is set for each pixel of a two-dimensional image that is obtained by perspective transformation of a three-dimensional object, based on brightness information set for that three-dimensional object, the two-dimensional image is divided into a plurality of areas based on the thus-set brightness information, and stepped shading is applied in units of the thus-divided plurality of areas. This brightness information could be set beforehand or it could be calculated in real-time, based on a given condition. The system could also comprise means for determining the pixels to be rendered by comparing the brightness information of each pixel with a given threshold value, then performing adjustment processing on the color information of the pixels to be rendered, based on color information that acts as a reference. This threshold value can be varied in accordance with the number of steps of shading, and adjustment processing can be performed a plurality of times on color information of pixels to be rendered.

16 Claims, 11 Drawing Sheets

FIG. 4
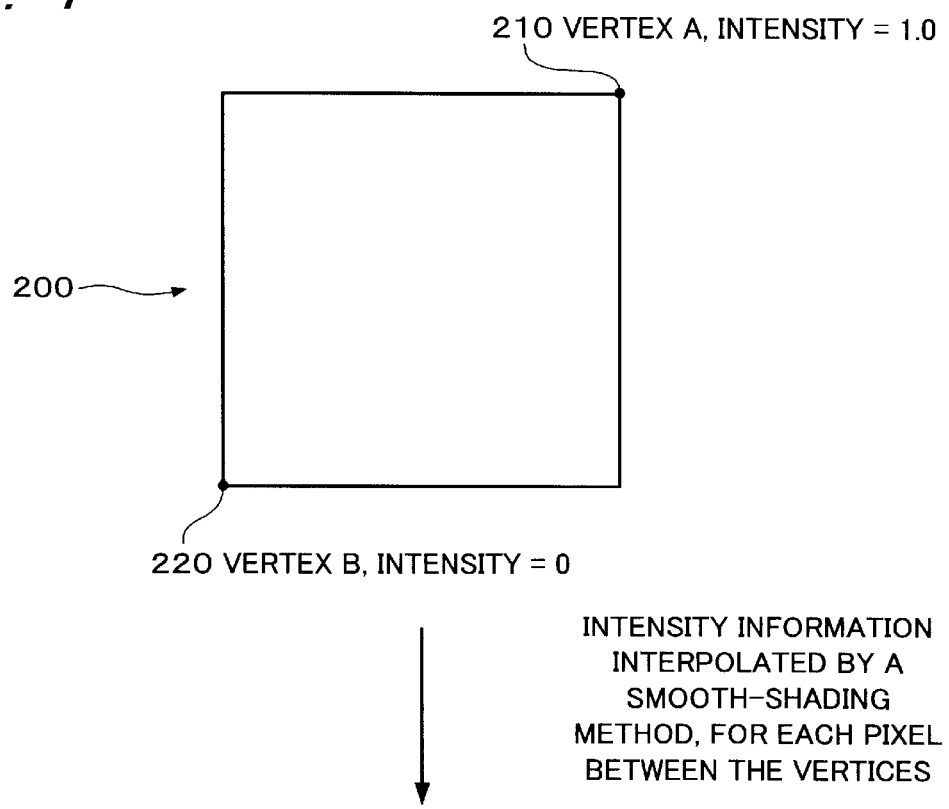
210 VERTEX A, INTENSITY = 1.0
200
220 VERTEX B, INTENSITY = 0
INTENSITY INFORMATION INTERPOLATED BY A SMOOTH-SHADING METHOD, FOR EACH PIXEL BETWEEN THE VERTICES
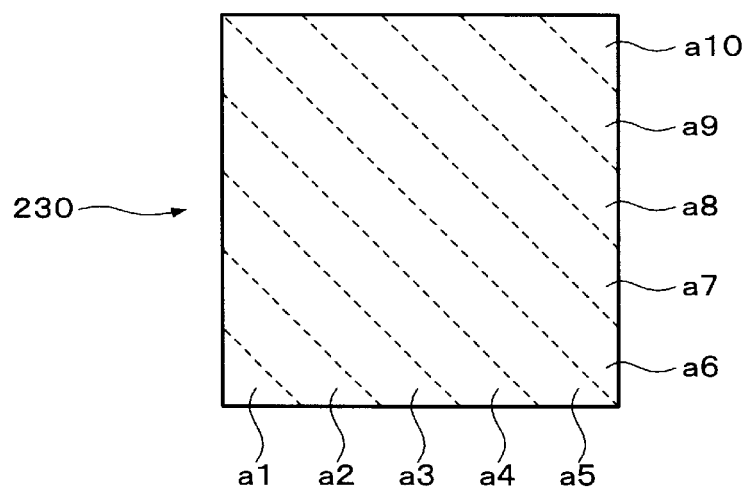
230
a1 : 0 < INTENSITY < 0.1
a2 : 0.1 ≦ INTENSITY < 0.2
a3 : 0.2 ≦ INTENSITY < 0.3
a4 : 0.3 ≦ INTENSITY < 0.4
a5 : 0.4 ≦ INTENSITY < 0.5
a6 : 0.5 ≦ INTENSITY < 0.6
a7 : 0.6 ≦ INTENSITY < 0.7
a8 : 0.7 ≦ INTENSITY < 0.8
a9 : 0.8 ≦ INTENSITY < 0.9
a10 : 0.9 ≦ INTENSITY < 1.0

FIG. 5
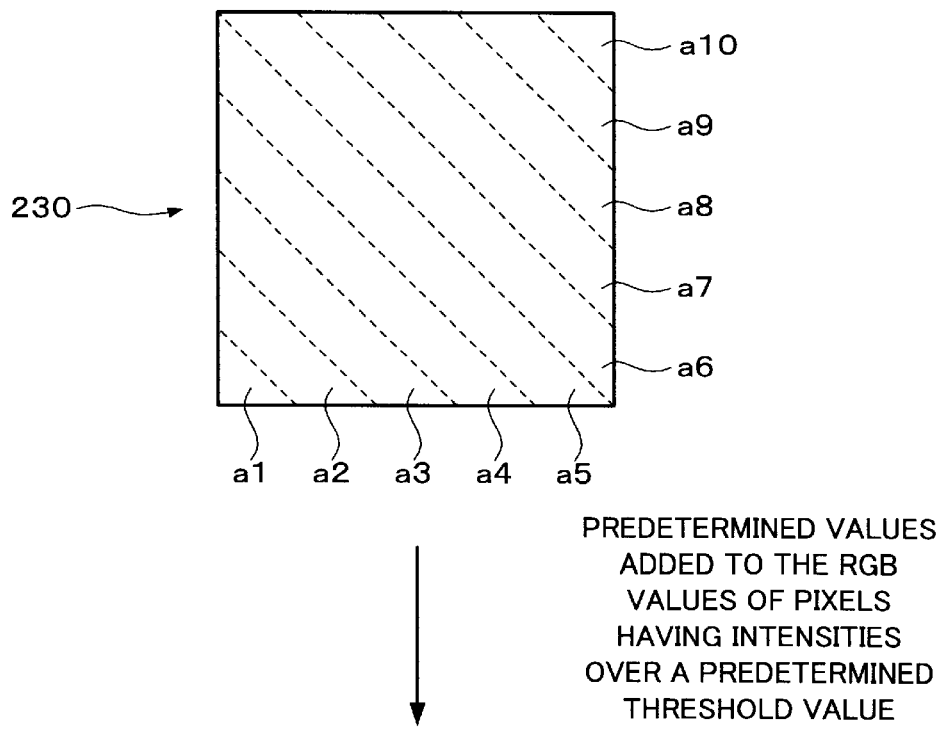
PREDETERMINED VALUES ADDED TO THE RGB VALUES OF PIXELS HAVING INTENSITIES OVER A PREDETERMINED THRESHOLD VALUE
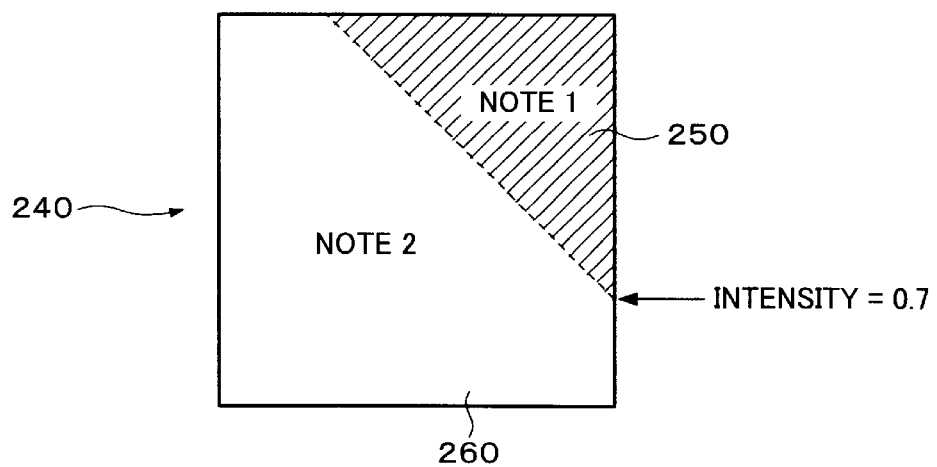
NOTE 1: (R, G, B) = (0, 0, 0) + (0.3, 0.3, 0.3) = (0.3, 0.3, 0.3)
NOTE 2: (R, G, B) = (0, 0, 0)

340 α PLANE OF TEMPORARY BUFFER

342 BACKGROUND PORTION, INTENSITY = 0

344 PERSPECTIVE-TRANSFORMED OBJECT PORTION, INTENSITY > 0

NOTE 3: AREA TO BE RENDERED, WHEN THRESHOLD VALUE = 0

350 FRAME BUFFER (R, G, B PLANES)

NOTE 4: RENDERING FROM (0, 0, 0) + (0.3, 0.1, 0.1) → (0.3, 0.1, 0.1)

IMAGE GENERATION SYSTEM AND PROGRAM

TECHNICAL FIELD

The present invention relates to an image generation system and a program.

BACKGROUND ART

An image generation device is known in the art for disposing a plurality of objects within an object space, which is a virtual three-dimensional space, and generating an image as seen from a given viewpoint within that object space, making it highly popular for enabling players to experience a virtual reality. With such an image generation system, it is desirable to generate realistic images to enhance the player's sensations of experiencing a virtual reality.

Incidentally, various different animation films and images become popular. These fascinate people, not because they are close to reality, but because they enable people to enjoy cel-style images that are the domain of animation.

However, animation images are projected from a recreation of previously prepared animation cel images, so they can be used for movies and moving images for a game opening, but it has not been possible to use them for game images that change in real-time. Either slick images with shading produced by smooth shading methods or two-dimensional images with absolutely no shading are used for game images that change in real-time.

The present applicants have proposed and developed an image generation system that changes a cel animation type of image in real-time, in accordance with a player's input. In this case, there is a problem concerning what sort of shading should be applied to produce a cel animation type of image.

It is theoretically possible to vary a cel animation image in real-time by applying a cel animation style of rendering, and an animation shader is known as a method therefore. However, the animation shader method involved a heavy processing load, so it is difficult to apply it to a domestic or arcade game system in which real-time response is required.

DISCLOSURE OF THE INVENTION

The present invention was devised in the light of the above described technical problem and has as an objective thereof the provision of an image generation system and a program that apply shading for producing an image that looks like cel animation, with a reduced processing load.

(1) The present invention relates to an image generation system which generates an image, comprising:

means which divides a three-dimensional object into a plurality of areas based on brightness information of the three-dimensional object; and means which applies stepped shading in units of the thus-divided areas.

A program in accordance with the present invention is a computer-usable program embodied on an information storage medium or in a carrier wave, comprising information (or a program) for implementing the above described means. There is also provided a computer-usable program in accordance with the present invention, that comprises a module for implementing the above described means.

In this case, the form of the brightness information is irrelevant. For instance, brightness information could be applied in units of vertices, polygon surfaces or pixels of a three-dimensional object. If there is a plurality of patterns for setting brightness that increases the closer that an object is to the viewer or brightness that increases with height, this information could be information that identifies those patterns.

This aspect of the present invention makes it possible to create a cel animation type of image by applying stepped shading to a three-dimensional object.

This makes it possible to create a real-time animation image in which a cel animation type of image changes in real-time in accordance with input such as manipulation input from a player.

(2) In the image generation system or the program embodied on an information storage medium or in a carrier wave according to the present invention, brightness information may be set for each pixel of a two-dimensional image that is obtained by perspective transformation of the three-dimensional object, based on the brightness information of the three-dimensional object; and the two-dimensional image may be divided into a plurality of areas, based on the thus-set brightness information.

The setting of the brightness information could be done by performing smooth shading based on brightness information set for a three-dimensional object, then computing brightness information for each pixel of a two-dimensional image, by way of example.

This aspect of the present invention makes it possible to apply stepped shading in accordance with brightness information for each pixel of a three-dimensional object.

(3) In the image generation system or the program embodied on an information storage medium or in a carrier wave according to the present invention, the brightness information may be set beforehand.

When creating images in which brightness is affected by external input and does not change in real-time, the brightness information can be set beforehand to reduce the computational load.

(4) In the image generation system or the program embodied on an information storage medium or in a carrier wave according to the present invention, the brightness information may be calculated in real-time, based on a given condition.

This given condition is information relating to the shape or disposition of an object, light source information, viewpoint information, or the like.

By computing the brightness information in real-time in accordance with a given condition in this manner, it becomes possible to apply stepped shading even when the player's input causes a real-time change such as a change in the shape or disposition of an object, or a light source, or the viewpoint position.

(5) In the image generation system or the program embodied on an information storage medium or in a carrier wave according to the present invention, stepped shading may be performed by adjustment of color information in units of the thus-divided areas.

Adjustment of color information means that an arithmetic computation, a logical computation, or a table-based computation is applied to values such as RGB, HSV, or HLS.

A pixel test could be performed by using brightness information, by way of example, and values such as RGB, HSV, or HLS could be added to or subtracted from with reference to RGB, HSV, or HLS values that acts as a reference in the frame buffer.

(6) The image generation system or the program embodied on an information storage medium or in a carrier wave according to the present invention, may further comprise means for determining a pixel to be rendered by comparing the brightness information set for each pixel with a given threshold value, then adjusting color information of the pixel to be rendered.

Only ajustment of a threshold value is required, and it is not necessary to compute where the color changes. The shading algorithms can thus be simplified, leading to a reduction in computational load.

(7) In the image generation system or the program embodied on an information storage medium or in a carrier wave according to the present invention, the threshold value may be varied in accordance with the number of steps of shading; and adjustment processing may be performed a plurality of times on color information of the pixel to be rendered.

This makes it possible to perform stepped shading automatically, by varying the threshold value and performing the adjustment processing a plurality of times, even when an object is divided into a plurality of areas in accordance with shading in steps. This enables shading in several stages, with a simple algorithm and reduced processing load.

BRIEF DESCRIPTION OF DRAWINGS

FIG. 4 is illustrative of a method of setting brightness information for each pixel of a two-dimensional image that is obtained by perspective transformation, based on brightness information set for a three-dimensional object.

FIG. 5 is illustrative of a method of dividing a two-dimensional image into a plurality of areas, then performing stepped shading on the thus-divided areas, based on brightness information that is set for each pixel.

BEST MODE FOR CARRYING OUT THE INVENTION

Embodiments of the present invention are described below with reference to the accompanying figures.

1. Configuration

Figure 1:
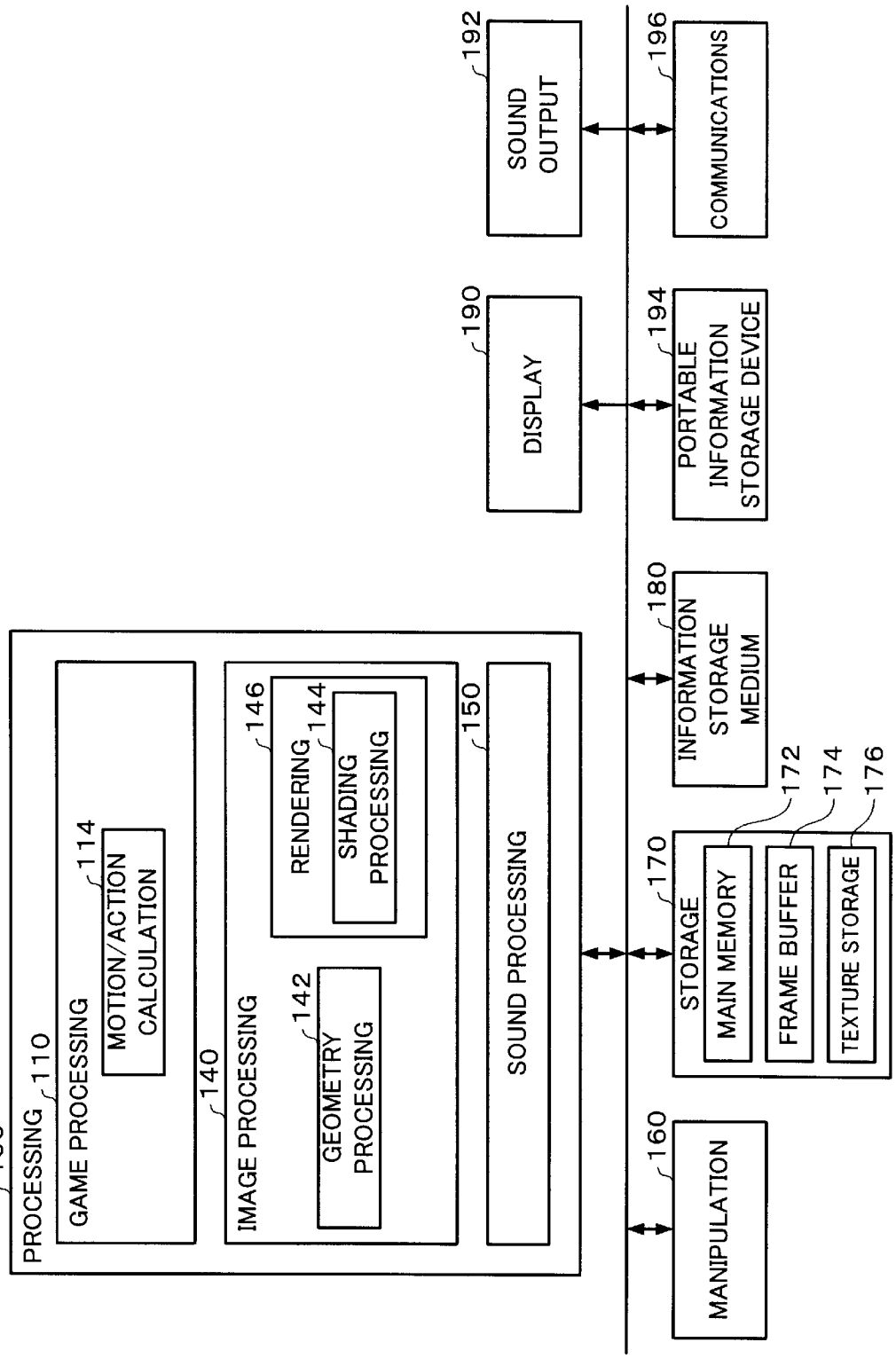
FIG. 1 shows a typical block diagram of an image generation system in accordance with an embodiment of the present invention.

A typical block diagram of an embodiment of this invention is shown in FIG. 1. Note that the embodiment shown in this figure comprises at least a processing section 100 (or the processing section 100 and a storage section 170, or the processing section 100, the storage section 170, and an information storage medium 180), but other blocks thereof (such as a manipulation section 160, a display section 190, a sound output section 192, and a portable information storage device 194) can be implemented by any other structural components.

In this case, the processing section 100 is designed to perform various types of processing, such as controlling the entire system, issuing instructions to the various blocks within the system, and performing various types of processing such as game processing, image processing, and sound processing, where the functions thereof can be implemented by hardware such as a processor of some sort (CPU or DSP, etc.) or an ASIC (such as a gate array), and by a given program (game program).

The manipulation section 160 is designed to enable the player to input operating data, where the functions thereof can be implemented by hardware such as a joystick, buttons, and a casing.

The storage section 170 acts as a work area for components such as the processing section 100 and a communications section 196, where the functions thereof can be implemented by hardware such as RAM.

The information storage medium (a storage medium that enables the reading of information therefrom by a computer) 180 stores information such as a program and data. The functions thereof can be implemented by hardware such as an optical disk (CD or DVD), a magneto-optical disk (MO), a magnetic disk, a hard disk, magnetic tape, or memory (ROM). The processing section 100 is designed to execute the various types of processing of this invention, based on information such as the program and data stored in this information storage medium 180. In other words, the information storage medium 180 contains various types of information (program and data) for implementing the means (particularly the blocks comprised within the processing section 100) of this embodiment of the present invention.

Note that all or part of the information stored in the information storage medium 180 can be transferred to the storage section 170 at a suitable time, such as at power-on. The information stored in the information storage medium 180 comprises at least one type of information, such as program coding for executing the processing in accordance with the present invention, image data, sound data, shape data for display objects, table data, list data, player information, information for instructing processing in accordance with the present invention, or information for performing processing in accordance with such instructions.

The display section 190 is designed to output images created by this embodiment of the present invention, and the functions thereof can be implemented by hardware such as a CRT, LCD panel, or head-mounted display (HMD).

The sound output section 192 is designed to output sounds created by this embodiment of the present invention and the functions thereof can be implemented by hardware such as a speaker.

The portable information storage device 194 stores data such as a player's personal data and saved data, and various devices such as a memory card or a portable game machine could be conceived as this portable information storage device 194.

The communications section 196 provides various types of control for communicating with an external device (such as a host machine or another image generation system), and the functions thereof can be implemented by hardware such as various types of processor or a communications ASIC, or a program.

Note that a program or data for executing the means of the present invention (this embodiment) could be distributed to the information storage medium 180 from an information storage medium possessed by a host machine (server), through a network and the communications section 196. Such use of an information storage medium on the host machine (server) is comprised within the scope of the present invention.

The processing section 100 comprises a game processing section 110, an image processing section 140, and a sound processing section 150.

In this case, the game processing section 110 performs various types of game processing based on manipulation data from the manipulation section 160, personal data or saved data from the portable information storage device 194, or a game program, such as: processing for accepting a coin (or equivalent), processing for setting various modes, processing for moving the game forward, processing for setting a selection screen, processing for obtaining the position and rotational angle (rotational angle about the X-, Y-, or Z-axis) of an object, processing for making an object operate (motion processing) processing for obtaining a viewpoint position and line-of-sight angle (line-of-sight direction), processing for disposing an object such as a map object in an object space, hit check processing, processing for calculating the game results (effects or score), processing to enable a plurality of players to play in a common game space, or game-over processing.

The image processing section 140 performs various types of image processing in accordance with instructions from the game processing section 110. Similarly, the sound processing section 150 performs various types of sound processing in accordance with instructions from the game processing section 110.

Note that all the functions of the image processing section 140 and the sound processing section 150 could be implemented by hardware alone or by programming alone. Alternatively, they could be implemented by both hardware and programming.

The game processing section 110 comprises a motion/action calculation section 114.

The motion/action calculation section 114 is designed to calculate movement information (position data and rotational angle data) of an object such as an automobile and action information (position data and rotational angle data of each part of the object), and performs processing to make the object move and act, based on data such as manipulation data input by the player through the manipulation section 160 and a game program.

More specifically, the motion/action calculation section 114 obtains the position and rotational angle of the object at certain intervals, such as every frame (1/60 second). Assume, by way of example, that the position of a moving body in a (k−1)th frame is PMk−1, the velocity thereof is VMk−1, the acceleration thereof is AMk−1, and the time of one frame is Δt. In that case, the position PMk and velocity VMk of that moving body in the kth frame can be obtained from the following equations (1) and (2):

$$PMk = PMk-1 + VMk-1 \times \Delta t \quad (1)$$

$$VMk = VMk-1 + AMk-1 \times \Delta t \quad (2)$$

The image processing section 140 comprises a geometry processing section (three-dimensional coordinate calculation section) 142 and a rendering section 146.

In this case, the geometry processing section 142 performs various different geometrical processes (three-dimensional coordinate operations) such as coordinate transformation, clipping, perspective transformation, or light-source computations.

The rendering section 146 comprises a shading processing section 144, which performs object rendering based on object data after geometrical processing (after perspective transformation) and textures stored in a texture buffer.

The shading processing section 144 divides each three-dimensional object into a plurality of areas based on brightness information set for that three-dimensional object, then subjects the thus-divided area units to stepped shading. The configuration could also be such that brightness information is set for each pixel of a two-dimensional image that is obtained by perspective transformation of that three-dimensional object, based on the brightness information of the three-dimensional object, and the two-dimensional image is divided into a plurality of areas based on the thus-set brightness information.

This brightness information could also be set previously, or it could be calculated in real time, based on a given condition.

The stepped shading could also be carried out by processing that adjusts color information for the thus-divided area units.

The configuration could also be such that the pixels to be rendered are determined by comparing the brightness information for each pixel with a given threshold value, then the color information of the pixels to be rendered is adjusted. The configuration could also be such that the above-mentioned threshold value is varied in accordance with the number of gradation steps and the adjustment of the color information of the pixels to be rendered is adjusted a plurality of times.

Note that the image generation system of this embodiment of the present invention could be applied to a system that provides a single-player mode which enables only one player to play at a time, or it can be applied to a system that also has a multi-player mode which also enables a plurality of players to play.

If a plurality of players are playing, the game images and sounds provided for this plurality of players could be created by a single terminal, or they could be created by using a plurality of terminals connected together by a means such as a network (transfer lines or a communications network).

2. Characteristic and Operation of This Embodiment

This embodiment of the present invention is characterized in that a three-dimensional object is divided into a plurality of areas based on brightness information set for that three-dimensional object, then stepped shading is applied to the thus-divided areas.

Figure 2:
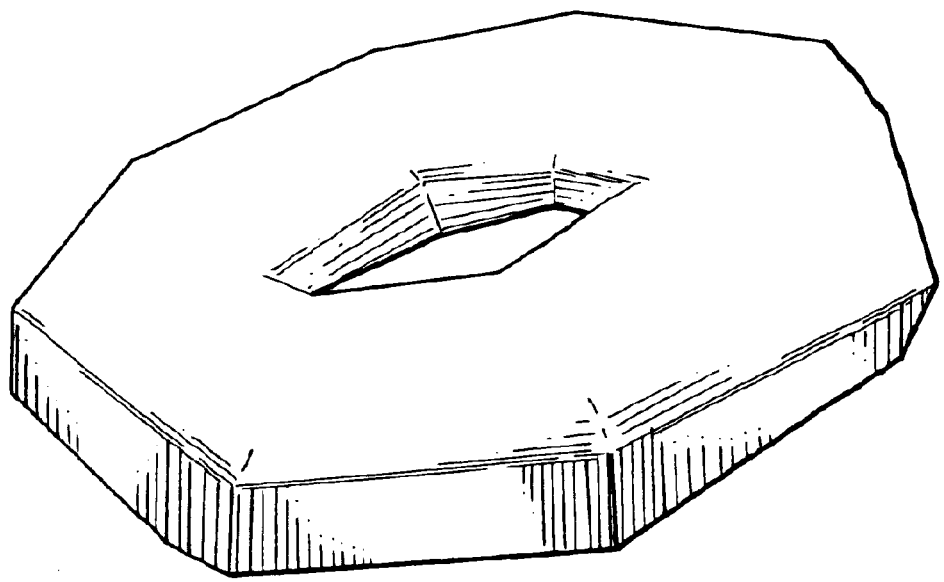
FIG. 2 shows an image obtained when smooth shading has been applied to a doughnut-shaped three-dimensional object.
Figure 3:
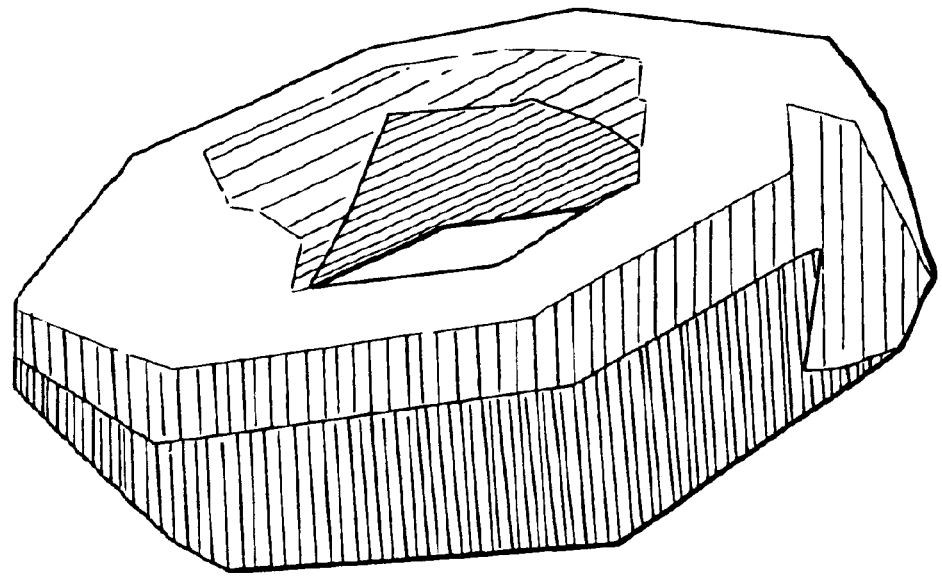
FIG. 3 shows an image obtained when shading in accordance with this embodiment of the invention has been applied to a doughnut-shaped three-dimensional object.

An image of a doughnut-shaped three-dimensional object to which smooth shading has been applied is shown in FIG. 2 and an image of a doughnut-shaped three-dimensional object to which shading in accordance with this embodiment of the present invention has been applied is shown in FIG. 3.

With prior-art three-dimensional computer graphics, it is usual to create a natural-looking image that is close to reality by applying smooth modeling using a method such as smooth shading, as shown in FIG. 2.

In contrast thereto, this embodiment of the present invention applies stepped shading that makes boundaries clearly discernible, as shown in FIG. 3, with the objective of producing a cel-animation style for a three-dimensional object.

The description now turns to the method of producing this cel-animation style for a three-dimensional object in accordance with this embodiment of the invention.

An example shown in FIG. 4 illustrates a method of setting brightness information for each pixel of a two-dimensional image that is obtained by perspective transformation based on brightness information set for a three-dimensional object.

Reference number 200 denotes a polygon surface of a three-dimensional object, where intensity information has been set to a vertex A (210) and a vertex B (220) as brightness information.

Note that the vertex intensity information could be set beforehand or it could be set by real-time calculations based on conditions such as information relating to the shape or disposition of the object, light-source information, or viewpoint information. In this case, assume that the intensity at vertex A (210) is 1.0 and that at vertex B (220) is 0.

With this embodiment of the present invention, intensity information is interpolated for each pixel between the vertices by a smooth-shading method based on these intensity values.

Reference number 230 is a schematic representation of a situation in which intensity information (0 to 1.0) has been set by the smooth-shading method for each pixel within the surface 200.

An example shown in FIG. 5 illustrates a method of dividing the two-dimensional image into a plurality of areas based on brightness information that has been set for each pixel, then allocating shading in a stepped fashion to the thus-divided plurality of areas.

With this embodiment of the invention, a pixel test is performed, using intensity information (see 230 in FIG. 5) that has been set for each pixel. In other words, predetermined values are added to the RGB values of any pixel having an intensity value that is greater than a predetermined threshold value.

Assume, by way of example, that the threshold value is 0.7 and the initial settings of the RGB values of the area denoted by 240 are (0, 0, 0). Additions are performed for pixels within an area 250 that has the intensity value 0.7 (see note 1) so that the RGB values of pixels belonging to that area become (0.3, 0.3, 0.3). In contrast thereto, no addition is performed within an area 260 where the intensity value is less than 0.7, so the RGB values thereof remain at (0, 0, 0) without change (see note 2).

In this manner, the RGB values can be adjusted in area units by simply setting a threshold value and performing an addition. It is therefore possible to perform stepped shading in area units without being concerned about whether there is a change in color.

The description now turns to an example of the operation of this embodiment of the present invention wherein the stepped shading is divided into three steps.

Figure 6:
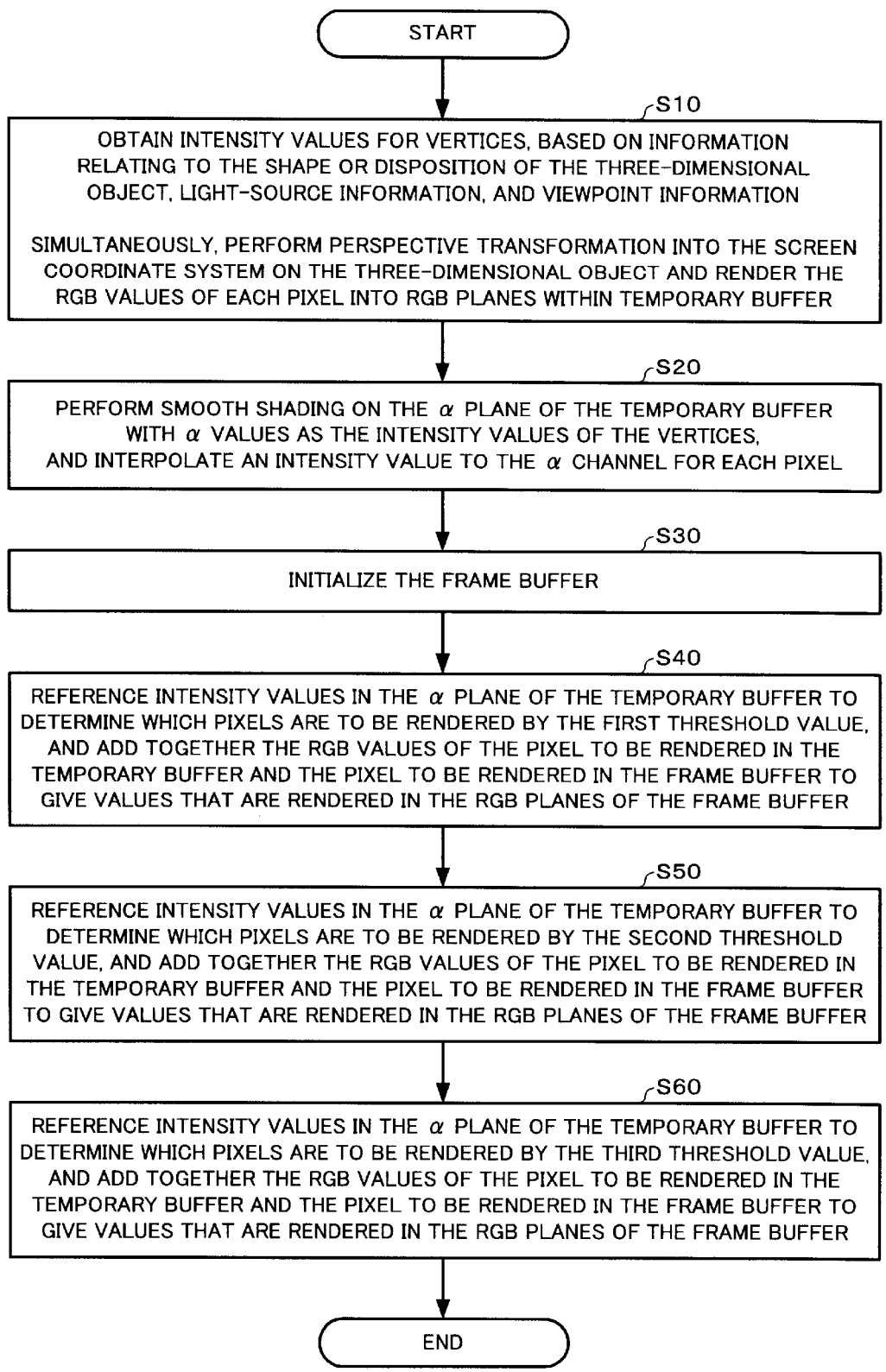
FIG. 6 is a flowchart illustrating an example of the operation of this embodiment of the invention.

A flowchart illustrating an example of the operation of this embodiment of the invention is shown in FIG. 6 and illustrations of stages in the processing of applying the stepped shading to a three-dimensional object are shown in FIGS. 7 to 10B.

First of all, intensity values of the vertices are obtained, based on data such as information relating to the shape or disposition of the three-dimensional object, light-source information, or viewpoint information. Simultaneously, perspective transformation into the screen coordinate system is performed on the three-dimensional object and the RGB values of each pixel are rendered into RGB planes within a temporary buffer (step S10).

Figure 7:
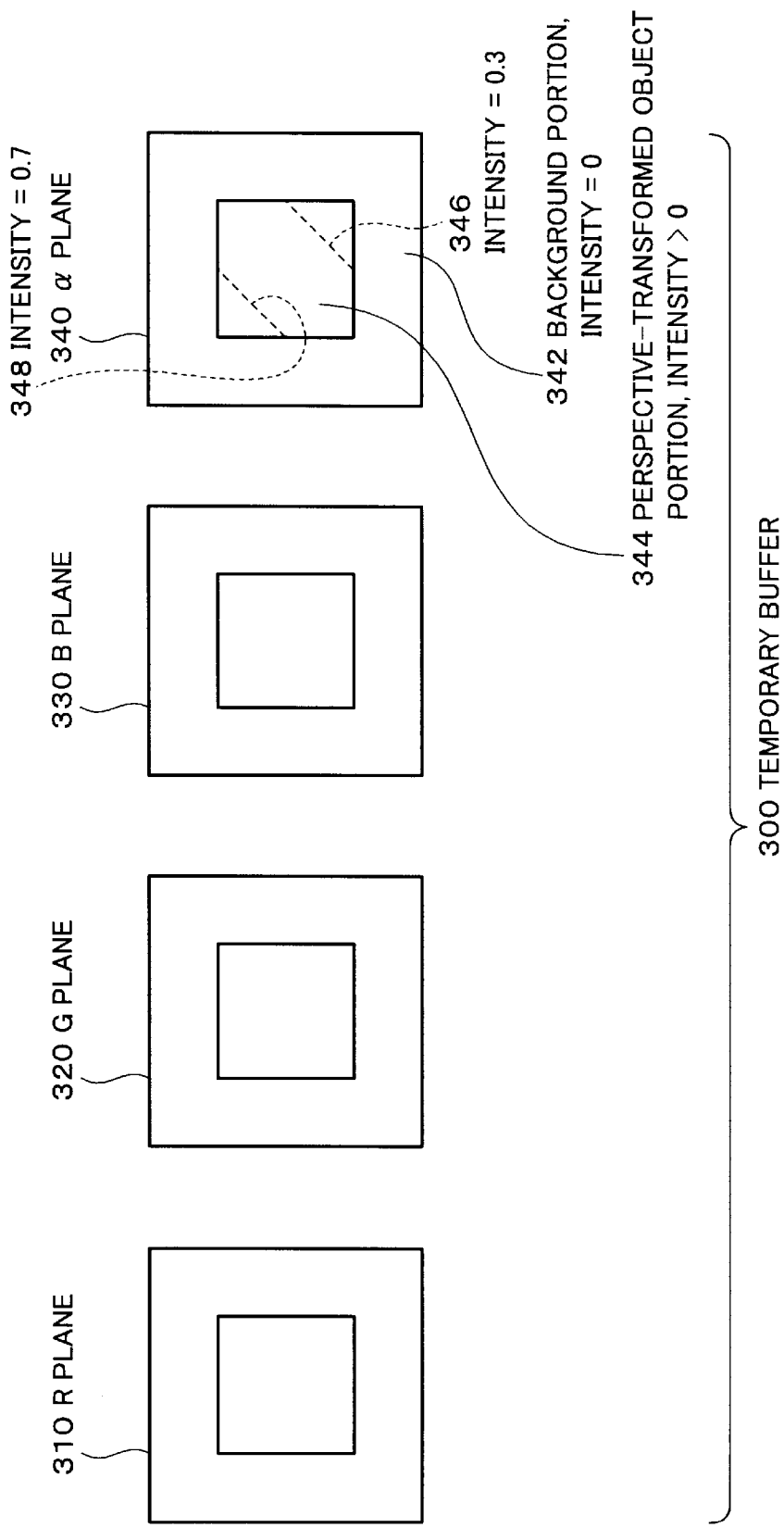
FIG. 7 is illustrative of the process of performing stepped shading on a three-dimensional object.

As shown in FIG. 7, a temporary buffer 300 has planes 310, 320, 330, and 340 for the R, G, B, and α values. The rendering of the RGB planes into the temporary buffer relates to the RGB values of the images of basic colors of the three-dimensional object. The basic colors are color information that is not related to shading so that a monochromatic three-dimensional object will have all pixels of the same value, by way of example. If a texture is mapped thereon, the RGB values of the colors thereof are rendered on the basis of the pattern, without considering any shading.

Reference numbers 310, 320, and 330 in FIG. 7 schematically represent the situation wherein RGB values of an object which is a three-dimensional object after perspective transformation (hereinafter called a "perspective-transformed object") have been rendered into the RGB planes of the temporary buffer. The description below is based on the assumption that the RGB values of all the pixels of the object (rectangular shape) after perspective transformation have been set to (0.3, 0.1, 0.1).

Smooth shading is then performed on the α plane of the temporary buffer with α values as the intensity values of the vertices, and an intensity value is interpolated to the α channel for each pixel (step S20). Reference number 340 in FIG. 7 schematically represents a situation in which the α values of the perspective-transformed object (rectangular shape) have been rendered into the α plane of the temporary buffer. Note that it is assumed in this case that the intensity value of a background portion 342 is 0 and the intensity value of a perspective-transformed object portion (rectangular shape) 344 is a value other than 0, in order to distinguish between the perspective-transformed object portion (rectangular shape) 344 and the background portion 342. Reference number 346 denotes a boundary line at which the intensity value becomes 0.3 (the upper left side thereof is at 0.3 or greater) and reference number 348 denotes a boundary line at which the intensity value becomes 0.7 (the upper left side thereof is at 0.7 or greater).

The frame buffer is then initialized (step S30).

A pixel test is then performed, based on a first threshold value. The intensity values in the α plane 340 of the temporary buffer are referenced to determine which pixels are to be rendered by the first threshold value. If the intensity value of a pixel is greater than the first threshold value, that pixel becomes a pixel to be rendered, and the RGB values of the pixel to be rendered in the temporary buffer and the pixel to be rendered in the frame buffer are added together to give values that are rendered in the RGB planes of the frame buffer (step S40).

Figure 8A:
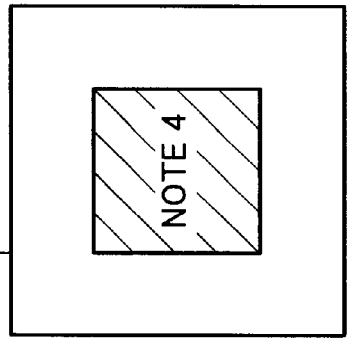
FIGS. 8A and 8B are further illustrative of the process of performing stepped shading on a three-dimensional object.
Figure 8B:
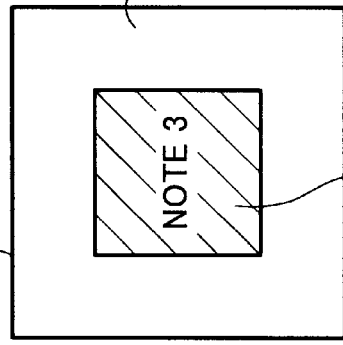

FIGS. 8A and 8B show the situation of the α plane 340 in the temporary buffer and a frame buffer 350 during the pixel test by the first threshold value. If the pixel test is performed with the first threshold value being 0, the intensity value of the perspective-transformed object portion 344 of FIG. 8A is greater than 0, so that portion is the area that will be subjected to rendering (see note 3). Thus rendering is performed on the RGB values (0.3, 0.1, 0.1), which are the sums of the RGB values (0, 0, 0) in the frame buffer and the RGB values (0.3, 0.1, 0.1) in the temporary buffer, for the pixels corresponding to the R, G, and B planes in the frame buffer 350, as shown in FIG. 8B (see note 4).

Another pixel test is then performed, based on a second threshold value. The intensity values in the α plane 340 of the temporary buffer are referenced to determine which pixels are to be rendered by the second threshold value. If the intensity value of a pixel is greater than the second threshold value, that pixel becomes a pixel to be rendered, and the RGB values of the pixel to be rendered in the temporary buffer and the pixel to be rendered in the frame buffer are added together to give values that are rendered in the RGB planes of the frame buffer (step S50).

Figure 9A:
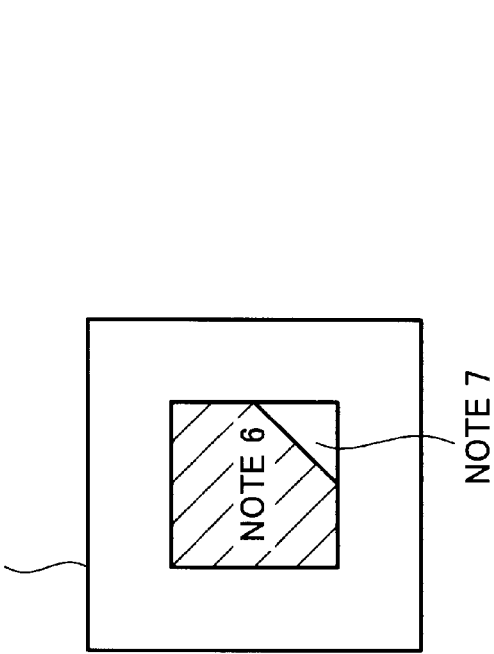
FIGS. 9A and 9B are even further illustrative of the process of performing stepped shading on a three-dimensional object.
Figure 9B:
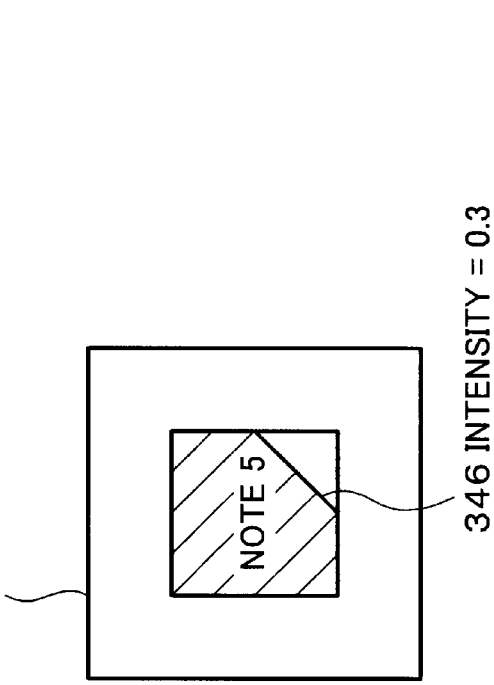

FIGS. 9A and 9B show the situation of the α plane 340 in the temporary buffer and the frame buffer 350 during the pixel test by the second threshold value. If the pixel test is performed with the second threshold value being 0.3, the intensity value of the shaded portion to the upper left of the boundary line 346 for the intensity of 0.3 is greater than 0.3, as shown in FIG. 9A, so that portion is the area that will be subjected to rendering (see note 5). Thus rendering is performed on the RGB values (0.6, 0.2, 0.2), which are the sums of the RGB values (0.3, 0.1, 0.1) in the frame buffer and the RGB values (0.3, 0.1, 0.1) in the temporary buffer, for the pixels corresponding to the R, G, and B planes in the frame buffer 350, as shown in FIG. 9B (see note 6).

Since no rendering is required for areas in which the intensity value is 0.3 or less, the RGB values (0.3, 0.1, 0.1) of FIG. 8B remain unchanged. With this procedure, the perspective-transformed object is divided into two areas and stepped shading is applied thereto in area units.

A further pixel test is then performed, based on a third threshold value. The intensity values in the α plane 340 of the temporary buffer are referenced to determine which pixels are to be rendered by the third threshold value.

If the intensity value of a pixel is greater than the third threshold value, that pixel becomes a pixel to be rendered and values that are the sums of the RGB values of the pixel to be rendered in the temporary buffer and the pixel to be rendered in the frame buffer are rendered in the RGB planes of the frame buffer (step S60).

Figure 10B:
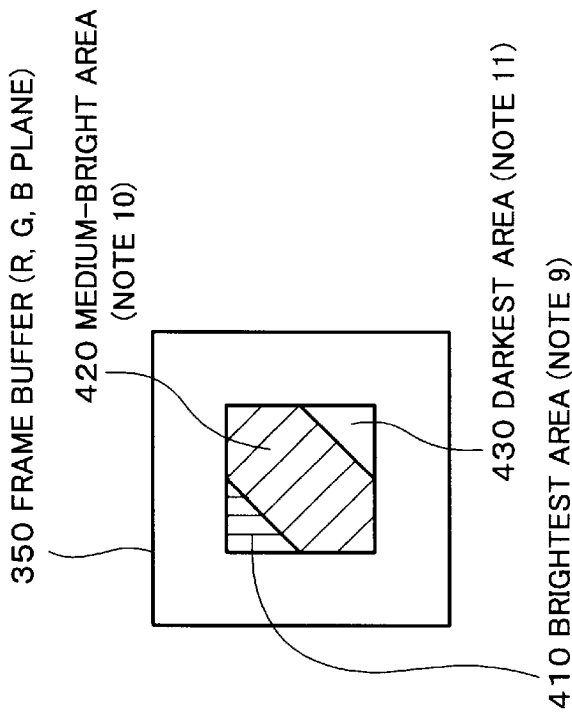
FIGS. 10A and 10B are still further illustrative of the process of performing stepped shading on a three-dimensional object.
Figure 10A:
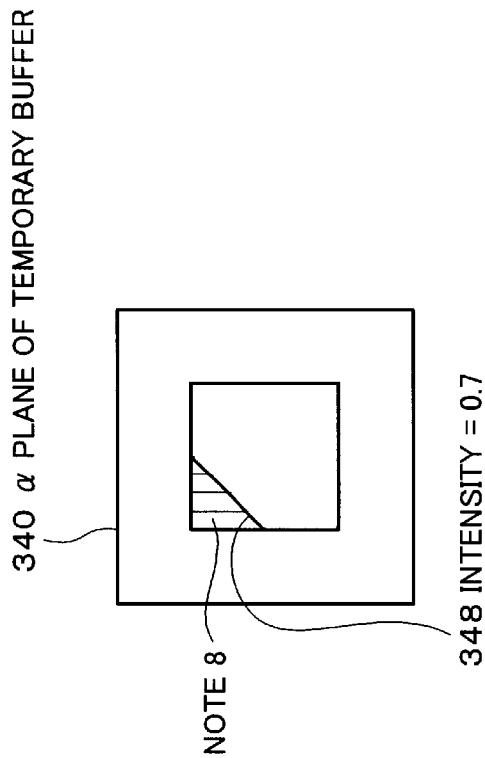

FIGS. 10A and 10B show the situation of the α plane 340 in the temporary buffer and the frame buffer 350 during the pixel test by the third threshold value. If the pixel test is performed with the second threshold value being 0.7, the intensity value of the shaded portion to the upper left of the boundary line 348 for the intensity of 0.7 is greater than 0.7, as shown in FIG. 10A, so that portion is the area that will be subjected to rendering (see note 8). Thus rendering is performed on the RGB values (0.9, 0.3, 0.3), which are the sums of the RGB values (0.6, 0.2, 0.2) in the frame buffer and the RGB values (0.3, 0.1, 0.1) in the temporary buffer, for the pixels corresponding to the R. G, and B planes in the frame buffer 350, as shown in 20 FIG. 10B (see note 9).

Since no rendering is required for areas in which the intensity value is 0.7 or less, the RGB values (0.6, 0.2, 0.2) (see note 10) and those of (0.3, 0.1, 0.1) (see note 11) of FIG. 9B remain unchanged. With this procedure, the perspective-transformed object is divided into three areas (an extremely bright area 410, a medium bright area 420, and an extremely dark area 430) and stepped shading is applied thereto in area units. This stepped shading in area units makes it possible to produce an image of a three-dimensional object that looks like cel animation.

This embodiment of the present invention determines the pixels to be rendered by setting threshold values with respect to intensity values in the α plane of the temporary buffer, to implement shading by adding to the RGB values for the pixels to be rendered. The shading algorithms can therefore be simplified, which leads to a reduction in the computational load.

It is also possible to provide color differentiation by boundaries, simply by interpolating α values by smooth shading then performing a pixel test on those α values. Implementing the interpolation of α values and the comparison of α values with a threshold value as hardware will make it possible to increase the processing speed further.

3. Hardware Configuration

Figure 11:
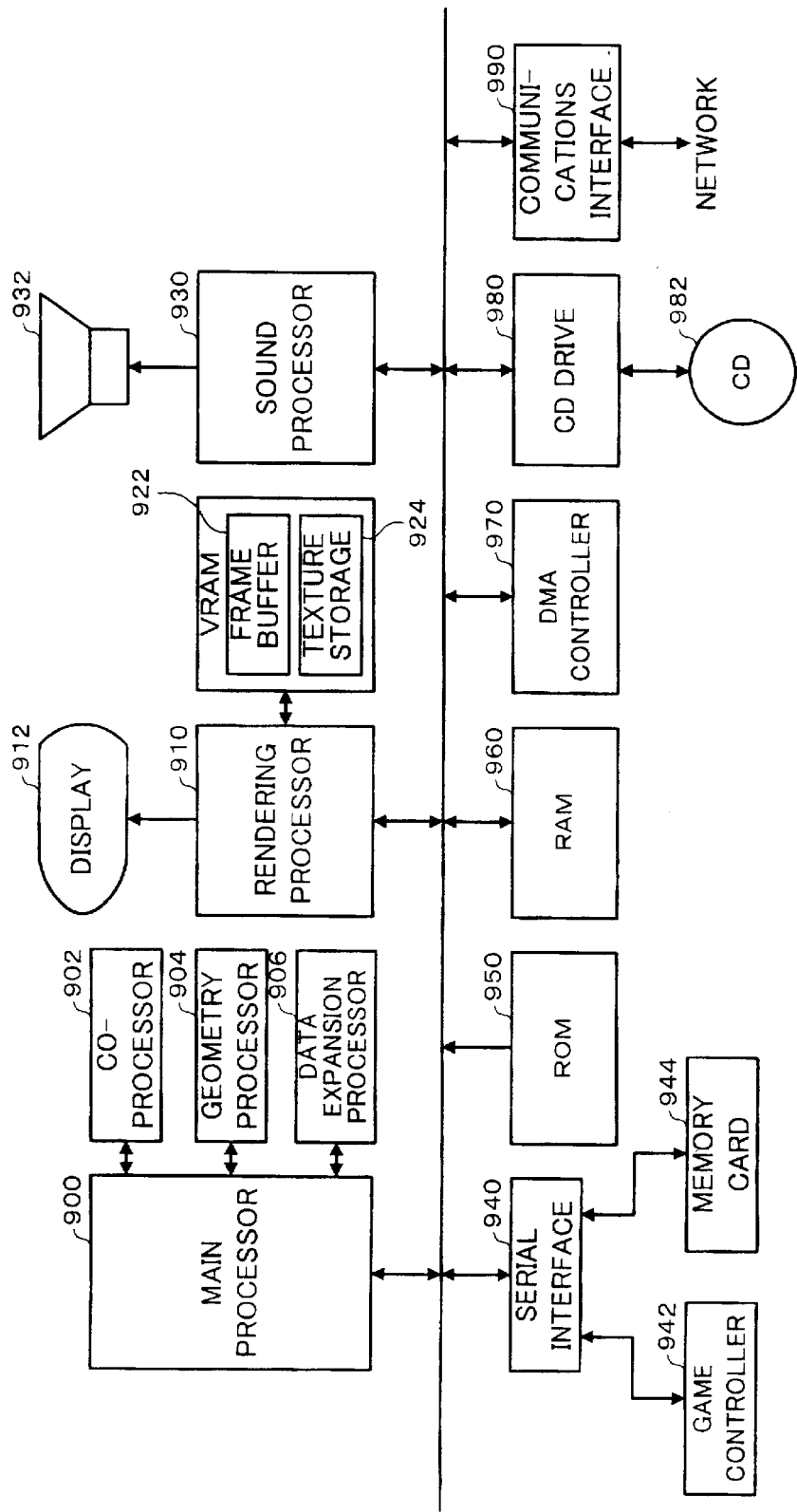
FIG. 11 shows an example of a hardware configuration that can implement this embodiment of the present invention.

The description now turns to an example of a hardware configuration that can implement this embodiment of the present invention, with reference to FIG. 11.

A main processor 900 executes various different types of processing such as actions, game processing, image processing, and sound processing, based on a program stored in a CD 982 (an information storage medium), a program transferred by a communications interface 990, or a program stored in a ROM 950 (an information storage medium).

A co-processor 902 is intended to supplement the processing of the main processor 900 and comprises product-summers and dividers that enable high-speed parallel computations, to execute matrix computations (vector computations) at high speed. When matrix computations or the like are necessary in a physical simulation for making an object move and act, by way of example, a program running on the main processor 900 will instruct the co-processor 902 to perform that processing.

A geometry processor 904 is designed to perform geometrical processing such as coordinate transformation, perspective transformation, light-source computation, and curved surface generation and comprises product-summers and dividers that enable high-speed parallel computations, to execute matrix computations (vector computations) at high speed. When processing such as coordinate transformation, perspective transformation, or light-source computation is performed, by way of example, a program running on the main processor 900 will instruct the geometry processor 904 to perform that processing.

A data expansion processor 906 expands and decodes compressed image and sound data, and performs processing to accelerate the decoding of the main processor 900. This ensures that moving images that have been compressed by the MPEG method or the like can be displayed during an opening screen, intermission screen, ending screen, or game screens. Note that the image and sound data to be decoded is stored in the ROM 950 or the CD 982, or is transferred from the exterior through the communications interface 990.

A rendering processor 910 is designed to render an object made up of primitive surfaces such as polygons or curved surfaces, at high speed. During the rendering of the object, the main processor 900 utilizes the functions of a DMA controller 970 to pass object data to the rendering processor 910 and also transfer textures in a texture storage section 924, if necessary. When that happens, the rendering processor 910 renders the object into a frame buffer 922 at high speed, based on this object data and textures, while utilizing a Z buffer or the like to erase hidden surfaces. The rendering processor 910 can also perform processing such as α-blending (translucency), mip mapping, fogging, trilinear filtering, anti-aliasing, and shading. When images for one frame are written to the frame buffer 922, those images are displayed on a display 912.

A sound processor 930 incorporates a multi-channel ADPCM audio source or the like and generates high-quality game sounds such as background music, sound effects, and voices. The thus-created game sounds are output from a speaker 932.

Manipulation data from a game controller 942 and save data and personal data from a memory card 944 are transferred through a serial interface 940.

A system program or the like is stored in the ROM 950. Note that the ROM 950 would function as an information storage medium if the system is an arcade game system, and various different programs would be stored in the ROM 950. Note also that a hard disk could be utilized instead of the ROM 950.

A RAM 960 is used as a work area for the various processors.

The DMA controller 970 controls DMA transfer between the processors and memory means (such as RAM, VRAM, or ROM).

A CD drive 980 drives the CD 982 (information storage medium) which contains data such as a program, image data, and sound data, enabling access to that program and data.

The communications interface 990 provides an interface for data transfer to and from external devices over a network. In this case, a communications network (analog telephone line or ISDN) or high-speed serial interface bus could be considered as the network connected to the communications interface 990. The use of a communications network would make it possible to transfer data via the Internet. The use of a high-speed serial interface bus would make it possible to transfer data to and from other devices such as another image generation system, another game system, or an information processing device (such as a personal computer, printer, mouse, or keyboard).

Note that the various means of the present invention could be implemented by hardware alone or they could be implemented by a program stored in an information storage medium or a program distributed via a communications interface. Alternatively, they could be implemented by both hardware and programming.

If the various means of the present invention are implemented by both hardware and a program, a program (program and data) for implementing the means of the present invention in hardware is stored in the information storage medium. More specifically, this program instructs the processors 902, 904, 906, 910, and 930, which are hardware, and also transfers data if necessary. The processors 902, 904, 906, 910, and 930 implement the various means in accordance with the present invention, based on these instructions and the transferred data.

Figure 12A:
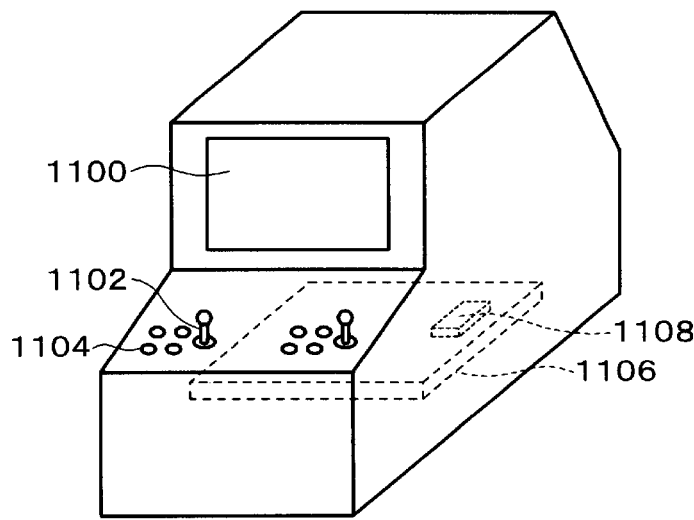
FIGS. 12A, 12B, and 12C show examples of various different systems to which this embodiment of the present invention is applied.

An example of this embodiment applied to an arcade game machine is shown in FIG. 12A. A player enjoys this game by operating controls such as a joystick 1102 and buttons 1104 while viewing a game image shown on a display 1100. Components such as processors and memory are mounted on an internal system .board (circuit board) 1106. A program (or program and data) for implementing the means of the present invention is stored in memory 1108 that is an information storage medium on the system board 1106. This information is hereinafter called stored information.

Figure 12B:
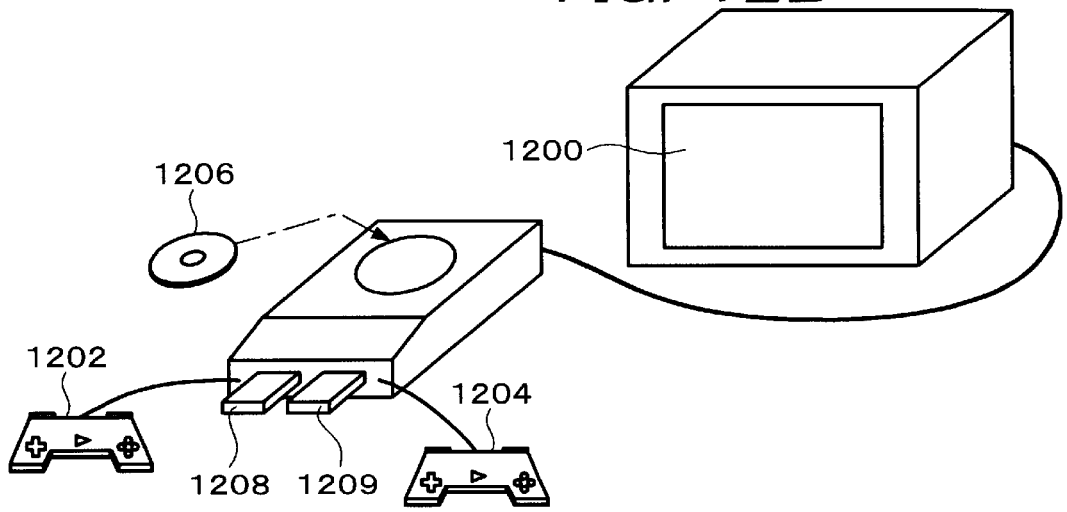

An example of this embodiment of the invention applied to a domestic game machine is shown in FIG. 12B. Players enjoy the game by manipulating game controllers 1202 and 1204 while viewing a game image shown on a display 1200. In this case, the above described stored information is stored in a CD 1206 or memory cards 1208 and 1209, which are information storage media that can be freely inserted into and removed from the main unit of the system.

Figure 12C:
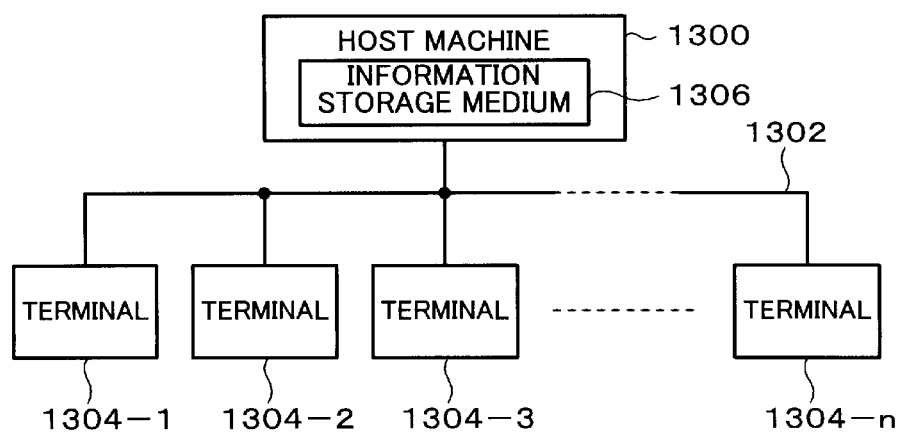

An example of this embodiment applied to a game machine is shown in FIG. 12C where the game machine comprises a host machine 1300 and terminals 1304-1 to 1304-n that are connected to the host machine 1300 by a network 1302 (a small-area network such as a LAN or a large-area network such as the Internet). In this case, the above described stored information is stored in an information storage medium 1306 such as a magnetic disk device, magnetic tape device, or memory that can be controlled by the host machine 1300. If game images and sounds can be generated by each of the terminals 1304-1 to 1304-n in a stand-alone manner, means such as a game program for generating game images and sounds is transferred to the terminals 1304-1 to 1304-n from the host machine 1300. If game images and sounds cannot be generated in a stand-alone manner by the terminals 1304-1 to 1304-n, on the other hand, the host machine 1300 creates them then transfers them to those terminals for output thereby.

Note that the processing of this invention in the configuration shown in FIG. 12C could also be divided between the host machine (server) and the terminals. Similarly, the above described stored information used for implementing the present invention could be divided between an information storage medium on the host machine (server) and information storage media of the terminals.

In addition, the terminals connected by the network could be either those of domestic game systems or those of arcade game systems. If arcade game systems are connected by a network, it is possible to use portable information storage devices (memory cards or hand-held game machines) that can exchange information with arcade game systems and also exchange information with domestic game systems.

Note that this invention is not limited to the above described embodiments and thus it can be implemented in various other ways.

For example, it is possible for an aspect of the present invention that is defined by a dependent claim to omit some of the configurational requirements. Similarly, the components of the present invention defined by an independent claim can be made to be dependent on other independent claims.

This embodiment of the present invention was described as relating to coordinate transformation and perspective transformation as examples of geometrical processing, but the geometrical processing of the present invention is not limited thereto.

In addition, the embodiment described herein related to a case in which the brightness information of a three-dimensional object was seto for vertices, but the present invention is not limited thereto. It could equally well be set for primitive surfaces or pixels.

Similarly, RGB values were cited as an example of color information, but the present invention is not limited thereto. Other values such as HSV or HLS could also be used.

Furthermore, addition was cited as an example of the adjustment of color information, but the present invention is not limited thereto. An arithmetic computation other than addition, or a logical computation, or a table-based computation could also be used, by way of example.

The description of this embodiment of the present invention related to the use of a two-pass method by which preliminary rendering is performed in a temporary buffer followed by rendering in the frame buffer, but the present invention is not limited thereto. It is also possible to implement a method by which writing to the frame buffer is done in a single pass, or methods in which rendering in the frame buffer is done in three or more passes.

The present invention can be applied to various games other than racing games (such as hand-to-hand combat games, shooting games, robot-battling games, sports games, competitive games, role-playing games, instrument-playing games, and dance games).

This invention is also not limited to arcade and domestic game systems; it can be applied to various other game systems such as large-scale attractions in which many players can participate, simulators, multimedia terminals, image generation systems, and system boards that create game images.

What is claimed is:

1. An image generation system which generates an image, comprising:

means which divides a three-dimensional object into a plurality of areas based on brightness information of the three-dimensional object;

means which obtains a two-dimensional image by perspective transformation of the three-dimensional object, wherein the brightness information is set for each pixel of a two-dimensional image based on the brightness information of the three-dimensional object, and wherein the two-dimensional image is divided into a plurality of areas, based on the thus-set brightness information;

means which applies stepped shading in units of the thus-divided areas of the two-dimensional image; and means for determining a pixel to be rendered by comparing the brightness information set for each pixel with a given threshold value, wherein the threshold value is varied in accordance with the number of steps of shading, and then adjusting color information a plurality of times of the pixel to be rendered.

2. The image generation system as defined in claim 1, wherein the brightness information is set beforehand.

3. The image generation system as defined in claim 1, wherein the brightness information is calculated in real-time, based on a given condition.

4. The image generation system a defined in claim 1,
wherein stepped shading is performed by adjustment of color information in units of the thus-divided areas.

5. A computer-usable program embodied on an information storage medium or in a carrier wave, for implementing:

means which divides a three-dimensional object into a plurality of areas based on brightness information of the three-dimensional object;

means which obtains a two-dimensional image by perspective transformation of the three-dimensional object, wherein the brightness information is set for each pixel of the two-dimensional image based on the brightness information of the three-dimensional object, and wherein the two-dimensional image is divided into a plurality of areas, based on the thus-set brightness information;

means which applies stepped shading in units of the thus-divided areas;

means for determining a pixel to be rendered by comparing the brightness information set for each pixel with a given threshold value, wherein the threshold value is varied in accordance with the number of steps of shading, and adjusting color information a plurality of times of the pixel to be rendered.

6. The program embodied on an information storage medium or in a carrier wave as defined in claim 5,
wherein the brightness information is set beforehand.

7. The program embodied on an information storage medium or in a carrier wave as defined in claim 5,
wherein the brightness information is calculated in real-time, based on a given condition.

8. The program embodied on an information storage medium or in a carrier wave as defined in claim 5,
wherein stepped shading is performed by adjustment of color information in units of the thus-divided areas.

9. A method for generating an image, comprising:

dividing a three-dimensional object into a plurality of areas based on brightness information of the three-dimensional object;

obtaining a two-dimensional image by perspective transformation of the three-dimensional object;

setting the brightness information for each pixel of the two-dimensional image, based on the brightness information of the three-dimensional object;

dividing the two-dimensional image into a plurality of areas, based on the thus-set brightness information;

applying stepped shading in units of the thus-divided areas of the two-dimensional image;

determining a pixel to be rendered by comparing the brightness information set for each pixel with a given threshold value, wherein the threshold value is varied in accordance with the number of steps of shading; and adjusting the color information of the pixel to be rendered a plurality of times.

10. The method for generating an image as defined in claim 9,
wherein the brightness information is set beforehand.

11. The method for generating an image as defined in claim 9,
wherein the brightness information is calculated in real-time, based on a given condition.

12. The method for generating an image as defined in claim 9,
wherein stepped shading is performed by adjustment of color information in units of the thus-divided areas.

13. An image generation system which generates an image, comprising:

means which divides a three-dimensional object into a plurality of areas based on brightness information of the three-dimensional object; and means which applies stepped shading in units of the thus-divided areas, by comparing the brightness information with a threshold value which is varied in accordance with the number of steps of shading.

14. The image generation system as defined in claim 13, wherein the brightness information is set beforehand.

15. The image generation system as defined in claim 13, wherein the brightness information is calculated in real-time, based on a given condition.

16. The image generation system a defined in claim 13,
wherein stepped shading is performed by adjustment of color information in units of the thus-divided areas.

* * * * *